United States Patent
Watanabe

(10) Patent No.: US 9,495,740 B2
(45) Date of Patent: Nov. 15, 2016

(54) MASK INSPECTION APPARATUS AND MASK INSPECTION METHOD

(71) Applicant: NuFlare Technology, Inc., Yokohama (JP)

(72) Inventor: Toshiyuki Watanabe, Kanagawa (JP)

(73) Assignee: NuFlare Technology, Inc., Yokohama (JP)

( * ) Notice: Subject to any disclaimer, the term of this patent is extended or adjusted under 35 U.S.C. 154(b) by 0 days.

(21) Appl. No.: 14/606,427

(22) Filed: Jan. 27, 2015

(65) Prior Publication Data
US 2015/0221075 A1    Aug. 6, 2015

(30) Foreign Application Priority Data

Jan. 31, 2014   (JP) ................................ 2014-017977

(51) Int. Cl.
| | | |
|---|---|---|
| G06T 7/00 | (2006.01) |
| H04N 5/372 | (2011.01) |
| H04N 5/225 | (2006.01) |
| H04N 5/359 | (2011.01) |
| H04N 5/33 | (2006.01) |

(52) U.S. Cl.
CPC ............. *G06T 7/001* (2013.01); *H04N 5/2256* (2013.01); *H04N 5/33* (2013.01); *H04N 5/359* (2013.01); *H04N 5/372* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 2004/0156080 A1* | 8/2004 | Bernardi | .............. | H04N 9/3194 358/3.26 |
| 2006/0239535 A1* | 10/2006 | Takada | .............. | G01N 21/95607 382/145 |
| 2009/0284591 A1* | 11/2009 | Tsuchiya | .......... | G01N 21/95607 348/92 |
| 2012/0075456 A1* | 3/2012 | Seitz | ...................... | G01B 11/02 348/79 |

FOREIGN PATENT DOCUMENTS

| | | |
|---|---|---|
| JP | 2008-249921 | 10/2008 |
| JP | 2009-300426 | 12/2009 |

\* cited by examiner

*Primary Examiner* — Andrew Moyer
*Assistant Examiner* — Kate R Duffy
(74) *Attorney, Agent, or Firm* — Oblon, McClelland, Maier & Neustadt, L.L.P.

(57) ABSTRACT

A mask inspection apparatus including, a driving unit configured to drive a stage holding an inspection target mask, in which a pattern is formed, or a calibration mask, a light irradiation device configured to irradiate light on the inspection target mask or the calibration mask, an image sensor configured to detect a light quantity signal of transmitted light or reflected light of the inspection target mask or the calibration mask at a plurality of pixels. A sensor amplifier configured to amplify an output of the image sensor with respect to each pixel, generates an optical image, and normalizes a gain and an offset of signal amplitude, wherein at a first setting the sensor amplifier sets the gain and the offset using the calibration mask, and at a second setting the sensor amplifier sets the gain and offset of the inspection target mask based on the first setting.

12 Claims, 8 Drawing Sheets

FIG. 5

| Image | | Laser Output | P1 | P2 | P3 |
|---|---|---|---|---|---|
| Transmission | Ave. Gray Scale Value (Reference Value :240) | Before Improvement | 241.2 | – | 216.3 |
| | | After Improvement | | 240.4 | 235.4 |
| Reflection | Ave. Gray Scale Value (Reference Value :200) | Before Improvement | 199.8 | – | 180.8 |
| | | After Improvement | | 199.1 | 197.2 |

MASK INSPECTION APPARATUS AND MASK INSPECTION METHOD

CROSS-REFERENCE TO THE RELATED APPLICATION

The entire disclosure of the Japanese Patent Application No. 2014-17977, filed on Jan. 31, 2014 including specification, claims, drawings, and summary, on which the Convention priority of the present application is based, are incorporated herein in its entirety.

FIELD OF THE INVENTION

The present invention relates to a mask inspection apparatus and a mask inspection method.

BACKGROUND

With high integration and large capacity of a Large Scale Integration (LSI), a circuit dimension required for a semiconductor element becomes increasingly narrow.

Using an original image pattern (that is, a mask or a reticle, hereinafter collectively referred to as a mask), a reduced-projection exposure apparatus called a stepper or a scanner exposes and transfers the pattern on a wafer to form a circuit, thereby producing the semiconductor element.

It is necessary to improve a production yield for costly LSI production. On the other hand, there is a demand for pattern formation having a line width of some dozen nanometers in a contemporary device. At this point, a defect of the mask pattern can be cited as a large factor that degrades the production yield. The finer the dimensions of an LSI pattern formed on a semiconductor wafer becomes, the finer the defect of the mask pattern becomes.

As fluctuations of various process conditions are absorbed by enhancing dimensional accuracy of the mask, it is necessary to detect the defect of the extremely small pattern in a mask inspection. Therefore, high accuracy is required for an apparatus that inspects patterns of a mask.

In a mask inspection apparatus, light output from a light source is emitted onto a mask through an optical system. The mask is mounted on a stage, and the emitted light scans the mask while the stage moves. The light transmits or is reflected with respect to the mask, and passes through a lens to image on a sensor. Then, the defect inspection is performed based on optical images acquired by the sensor.

Examples of mask inspection methods using a mask inspection apparatus include a die-to-die comparison method and a die-to-database comparison method. In the die-to-die comparison method, an optical image is compared with another optical image of the same pattern as the optical image at a different location. On the other hand, in the die-to-database comparison method, a reference image generated from design data (CAD data) used in mask production and an optical image of the actual pattern on the mask are compared to each other.

In order to generate an optical image, a charge storage type time delay integration (TDI) sensor and a sensor amplifier that amplifies an output of the TDI sensor are used. In a case where an inspection is performed by transmitted light, for example, a halftone type phase shift mask can obtain a contrast of a light shielding film and a glass substrate to some degree. Therefore, as in a chrome mask, there is adopted a method of determining a defect by recognizing a mask pattern using a light intensity signal of a sensor image that is light-received by a detection optical system.

Depending on the shape of the defect, the contrast may be easily obtained when reflected light of a mask surface is used. There is also an inspection method using a reflection inspection optical system for the purpose of a foreign particle inspection function or the like. Also, there is disclosed a mask inspection method capable of performing a defect inspection with high detection sensitivity by easily correcting a focus deviation of transmitted illumination light caused by variation in a mask thickness (see JP 2008-249921 A).

In the comparison between the reference image and the optical image, it is known to perform the calibration of the gain and the offset for sensor amplifier output adjustment, using the calibration pattern. In this calibration, there is also a case where miniaturization of a pattern etched on a mask is progressed and a black region or a white region of a sufficiently wide area does not exist in a mask pattern itself. There is also a case where it is difficult to provide the calibration pattern in the inspection target mask due to the expansion of the area occupied by the product pattern.

In a case where it is difficult to provide the calibration pattern in the inspection target mask, a calibration mask in which a black region and a white region are formed on a film of the same type as that of the inspection target mask and which calibrates an offset and a gain (hereinafter, simply referred to as a calibration mask) is used.

In a case where the calibration is performed using the calibration mask, after the calibration is performed, the mask defect inspection is performed on the inspection target mask. On the other hand, there is also disclosed a mask inspection method in which the offset gain of the sensor amplifier can be calibrated using the inspection target mask even when a black region and a white region of a sufficient size as compared with an imaging area of a TDI sensor do not exist in the inspection target mask (see JP 2009-300426 A).

However, for example, in a case where a mask with a pellicle is inspected, since a region necessary for light quantity calibration does not exist in the pellicle, the light quantity calibration is performed using a calibration mask with a pellicle separately from the mask to be inspected.

In the calibration using the calibration mask, for example, filter conditions of the optical system as well as gain and offset values to be set to the TDI sensor are stored in a file. The stored file is read and the filter conditions of the optical system as well as the gain and offset values of the TDI sensor are set.

In the calibration using the calibration mask, apparatus states, such as the light quantity of the light source, are changed at the time of the actual inspection. Thus, an appropriate calibration operation is not performed and a false defect induction may be caused.

In the mask inspection apparatus and the mask inspection method that perform the inspection using the calibration mask, normalization of the light quantity calibration sensor performing the calibration of the light quantity change is executed when the light quantity calibration and the file reading light quantity calibration are performed. That is, the relationship between the light quantity and the TDI sensor output is made constant and the determination of the gain is also performed. The normalization of the light quantity calibration sensor is performed whenever the light quantity calibration is performed.

In such a calibration, in a case where the light quantity at the time when the light quantity calibration is performed using the calibration mask is different from the light quantity at the time when the inspection target mask is inspected, a gray scale value of the TDI sensor image is different from a specified value, which results in a false defect.

The present invention has been made in view of the issues described above. That is, an object of the present invention is to provide a mask inspection apparatus and a mask inspection method, which are capable of suppressing a gray scale value of a sensor image from being different from a specified value in a case where a light quantity at the time when a light quantity calibration is performed using a calibration mask is different from a light quantity at the time when an inspection target mask is inspected.

SUMMARY OF THE INVENTION

According to one aspect of the present invention, a mask inspection apparatus includes a driving unit configured to drive a stage holding an inspection target mask, in which a pattern is formed, or a calibration mask different from the inspection target mask, a light irradiation device configured to irradiate light on the inspection target mask or the calibration mask, an image sensor configured to detect a light quantity signal of transmitted light or reflected light of the inspection target mask or the calibration mask at a plurality of pixels, a sensor amplifier configured to amplify an output of each of the pixels of the image sensor with respect to each pixel, generates an optical image, and sets and normalizes a gain and an offset of signal amplitude, wherein at a first setting before a defect inspection of the pattern of the inspection target mask is performed, the sensor amplifier sets the gain and the offset using the calibration mask, and at a second setting when the defect inspection is performed after the first setting, the sensor amplifier sets the gain and the offset of the inspection target mask based on the gain and the offset set at the first setting, a gain resetting unit configured to reset the gain set to the sensor amplifier at the second setting according to a difference between an apparatus state at the first setting and an apparatus state at the second setting, a reference image generation unit configured to generate a reference image serving as a standard image for the optical image, and a comparison unit configured to inspect a defect of the pattern of the inspection target mask by comparing the optical image with the reference image.

In another aspect of the present invention, a mask inspection method, which performs a defect inspection on a pattern formed in an inspection target mask by illuminating the inspection target mask with light of a light source through an objective lens, forming an image with light reflected from the inspection target mask or light passing through the inspection target mask on an image sensor through the objective lens, and comparing an optical image, which is obtained by relatively moving the image sensor with respect to the inspection target mask and amplifying an output of each pixel of the image sensor by a sensor amplifier which sets and normalizes a gain and an offset of signal amplitude with respect to each pixel, with a reference image being a standard image for the optical image. The mask inspection method includes at a first setting before a defect inspection of the pattern of the inspection target mask is performed, setting and storing the gain and the offset using a calibration mask different from the inspection target mask, and normalizing and storing an apparatus state. At a second setting when the defect inspection is performed after the first setting, setting the gain and the offset stored at the first setting to the sensor amplifier; and resetting the gain set to the sensor amplifier according to a difference between the apparatus state stored at the first setting and the apparatus state at the second setting.

In another aspect of the present invention, a mask inspection method, which performs a defect inspection on a pattern formed in an inspection target mask by illuminating the inspection target mask with light of a light source through an objective lens, forming an image with light reflected from the inspection target mask or light passing through the inspection target mask on an image sensor through the objective lens, and comparing an optical image, which is obtained by relatively moving the image sensor with respect to the inspection target mask and amplifying an output of each pixel of the image sensor by a sensor amplifier which sets and normalizes a gain and an offset of signal amplitude with respect to each pixel, with a reference image being a standard image for the optical image. The mask inspection method includes setting, to sensor amplifier, the gain set and stored using a calibration mask different from the inspection target mask, and resetting the gain set to the sensor amplifier according to a difference between a normalized and stored apparatus state and a sensed apparatus state. Comparing an optical image amplified using the reset gain by the sensor amplifier with the reference image, and determining the pattern as a defect when a comparison result exceeds a preset threshold value.

BRIEF DESCRIPTION OF THE DRAWINGS

FIG. 5 is a table showing the evaluation result of the light quantity calibration of the embodiment and the general light quantity calibration.

DETAILED DESCRIPTION OF THE EMBODIMENT

Figure 1:
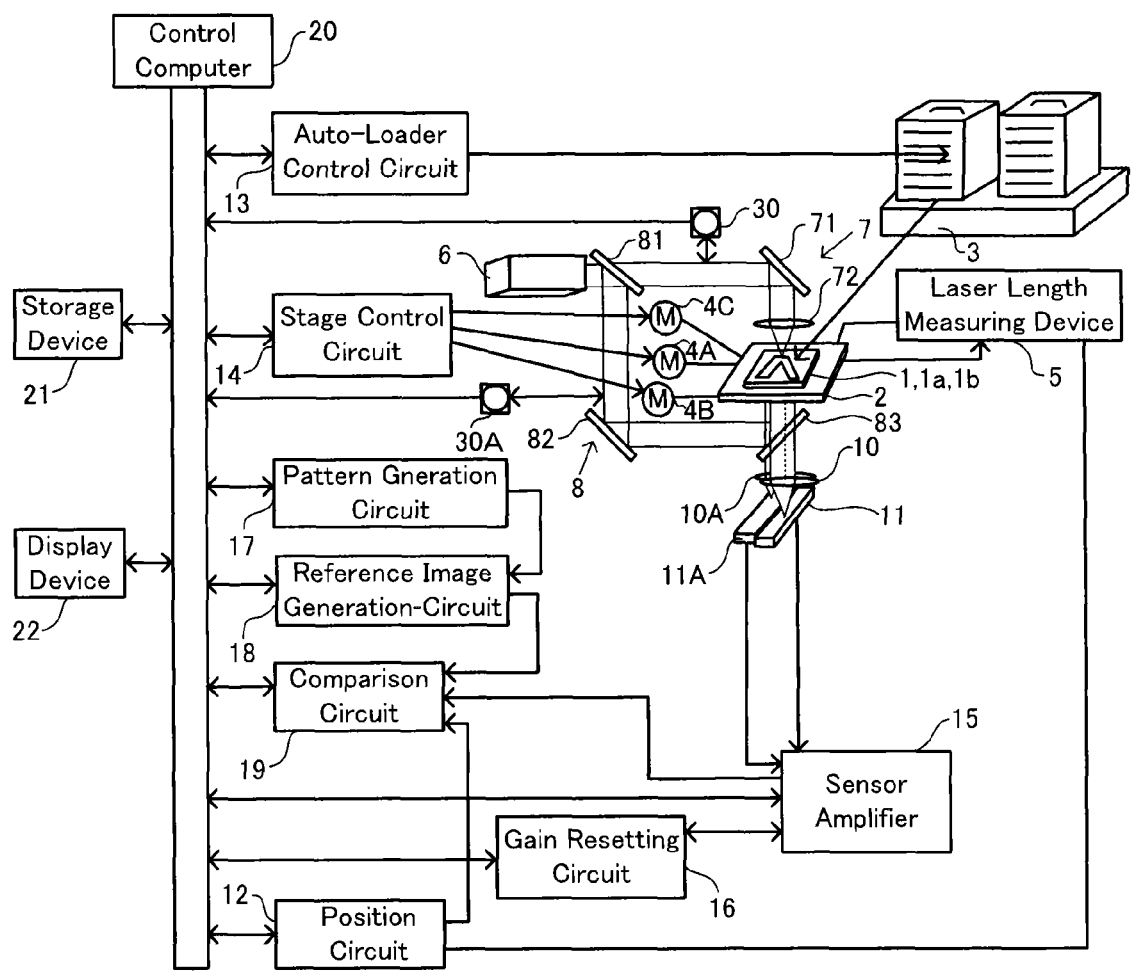
FIG. 1 is a schematic diagram of a mask inspection apparatus as an example of a mask inspection apparatus according to the present invention.

FIG. 1 is a schematic diagram of a mask inspection apparatus 100 as an example of a mask inspection apparatus according to the present invention.

In the mask inspection apparatus 100 as shown in FIG. 1, a configuration unit necessary in the present embodiment is illustrated. However, another well-known configuration unit necessary for an inspection may be used. As used herein, a "means" or "circuit" can be configured by a program operating on a computer. Alternatively, the "means" or "circuit" may be constructed by not only the program that is software, but also a combination of software, hardware, or firmware. In the case that the "means" or "circuit" may be constructed by the program, the program can be recorded in a recording device such as a magnetic disk drive.

The mask inspection apparatus 100 illustrated in FIG. 1 includes a stage 2 that holds an inspection target mask 1a to be inspected or a calibration mask 1b prepared for calibration separately from the inspection target mask 1a (hereinafter, referred to as a mask 1 in a case where there is no need to distinguish the masks 1a and 1b). The mask 1 is conveyed on the stage 2 from an auto-loader 3. The auto-loader 3 is controlled by an auto-loader control circuit 13.

The stage 2 is an example of a driving unit and is driven in an X direction, a Y direction, and a θ direction by an X-direction motor 4A, a Y-direction motor 4B, and a θ-direction (horizontal rotating direction) motor 4C. The driving control of the motors 4A, 4B, and 4C is performed by a stage control circuit 14.

For example, positions of the stage 2 in the X-direction and the Y-direction are detected by a laser length measuring device 5 such as a laser interferometer and a position circuit 12 connected to the laser length measuring device 5. For example, the capturing by the sensor is performed while the inspection target mask continuously moves at a constant speed in the X direction. After the inspection target mask moves to the end (stripe end) in the Y direction, the capturing by the sensor is performed while the inspection target mask continuously moves at a constant speed in a direction opposite to the X direction. By repeating such capturing, the whole inspection region of the inspection target mask is captured.

Also, the mask inspection apparatus 100 includes a light source 6 provided as an example of a light irradiation device to emit a laser beam, a transmissive illumination optical system 7 that transmits the laser beam emitted from the light source 6 by irradiating the laser beam on the mask 1 through a beam splitter 81, and a reflective optical system 8 that reflects the laser beam emitted from the light source 6 by irradiating the laser beam on the mask 1 through the beam splitter 81.

The transmissive illumination optical system 7 includes a mirror 71, an objective lens 72, an objective lens 10 that forms an image with transmitted light on a TDI sensor 11, and an irradiated light quantity sensor 30 provided between the beam splitter 81 and the mirror 71. The reflective optical system 8 includes a mirror 82, a beam splitter 83, an objective lens 10A that forms an image with reflected light on a TDI sensor 11A, and an irradiated light quantity sensor 30A provided between the beam splitter 81 and the mirror 82. A normalization of an offset and a gain of a sensor amplifier 15 to be described below may be performed using the TDI sensor 11A, independently of the TDI sensor 11. Hereinafter, in a case where there is no need to distinguish the transmissive illumination optical system 7 from the reflective optical system 8, the description will be given using the configuration of the transmissive illumination optical system 7.

Figure 2:
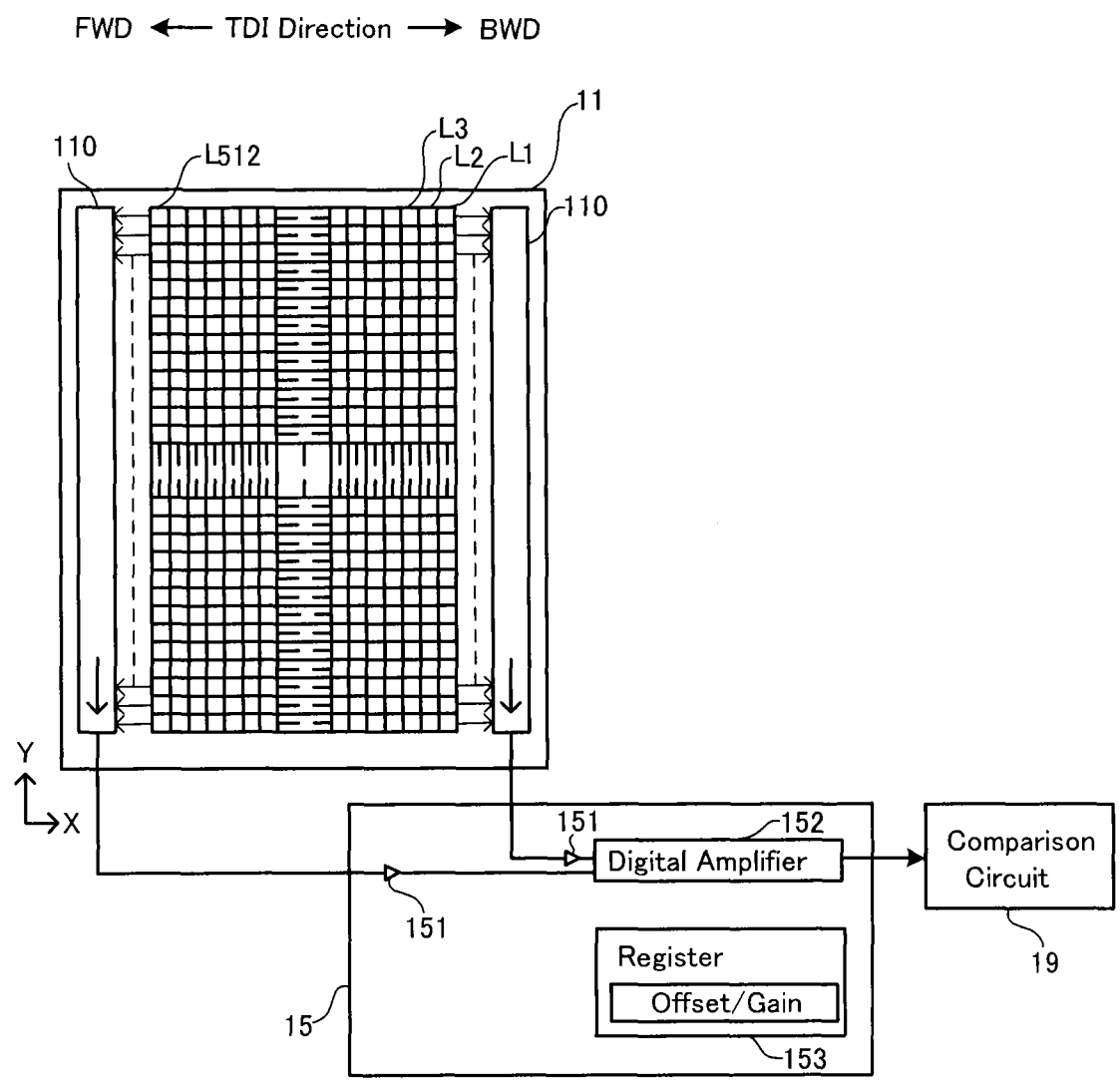
FIG. 2 shows a two-dimensional TDI sensor as one example of an image sensor.

As illustrated in FIG. 2, the TDI sensor 11 as an example of an image sensor is a two-dimensional CCD sensor. For example, the TDI sensor 11 has an imaging region of 2,048 pixels×512 pixels (144 μm×36 μm in a case where 1 pixel is 70 nm×70 nm). That is, the TDI sensor 11 is configured by a plurality of stages (for example, 512 stages) of lines L1, L2, . . . , L512 in a TDI direction. Each of the lines L1, L2, . . . , L512 is configured by a plurality of pixels (for example, 2,048 pixels).

In the above configuration, the TDI sensor 11 is installed such that the TDI direction (direction of 512 stages) of the TDI sensor 11 is matched with the X direction of the stage 2, and the TDI sensor 11 is relatively moved with respect to the mask 1 in response to the movement of the stage 2. In this way, the pattern of the mask 1 is captured by the TDI sensor 11. When the TDI sensor 11 is relatively moved in a right direction of FIG. 2, a left direction (FWD) of FIG. 2 is a charge accumulation direction of the TDI sensor 11 (TDI direction). In this case, the charges are accumulated while being sequentially transferred from the line L1 of the first stage to the lines L2, L3, . . . in the FWD direction, and an image signal corresponding to one line (2,048 pixels) is output from the line L512 of the final stage.

Also, when the moving direction of the stage 2 is reversed, that is, when the TDI sensor 11 is relatively moved in the left direction of FIG. 2, the charge accumulation direction of the TDI sensor 11 is switched to the right direction (BWD) of FIG. 2. The TDI sensor 11 includes an output unit 110 configured to be output to both ends of the charge accumulation direction. That is, the TDI sensor 11 can read the charges from both directions.

The TDI sensor 11 is connected to the sensor amplifier 15. The sensor amplifier 15 normalizes the light quantity signal of each pixel that is input from the TDI sensor 11, and outputs the normalized light quantity signal to a comparison circuit 19. In the mask inspection apparatus used in the present embodiment, the TDI sensor 11 is used as the image sensor; however, other image sensor, such as a line sensor or an area sensor, may be used instead of the TDI sensor 11.

For example, as illustrated in FIG. 2, the sensor amplifier 15 includes an analog amplifier 151 that amplifies the signal of each pixel at a fixed magnification, and a digital amplifier 152 that amplifies the signal of each pixel at an offset and a gain stored in a register 153. Through the calibration operation to be described below, the amplifier gain and offset of each pixel are adjusted such that black and white amplitude and a black offset level of each pixel output from the sensor amplifier 15 become homogeneous. Data output from the sensor amplifier 15 is transmitted to the comparison circuit 19 together with data output from the position circuit 12 to indicate the position of the mask 1 on the stage 2. Also, the reference image is transmitted to the comparison circuit 19.

The sensor amplifier 15 amplifies the output of each pixel of the TDI sensor 11 with respect to each pixel, generates an optical image, and sets and normalizes the gain and the offset of the signal amplitude with respect to each pixel. That is, at a first setting prior to the defect inspection of the pattern of the inspection target mask 1a, the sensor amplifier 15 sets the gain and the offset using the calibration mask and stores the gain and the offset as a file.

At a second setting at the time when the defect inspection of the inspection target mask 1a is performed after the first setting, the gain and the offset are set to the inspection target mask 1a using the gain and the offset set and stored at the first setting. In the embodiment, it is configured such that the gain set to the sensor amplifier 15 is reset using a gain resetting circuit 16 to be described below.

In the gain resetting circuit 16 as an example of a gain resetting unit, when the light quantity calibration is performed using the calibration mask 1b, a difference between an apparatus state at the first setting and an apparatus state at the second setting is output to the sensor amplifier 15. In the embodiment, a difference of the light quantity from the light source 6 is an example of the difference of the apparatus state, and the difference of the light quantity is sensed by the irradiated light quantity sensor 30 that is an example of the light quantity calibration sensor installed in the transmissive illumination optical system 7.

That is, at the second setting, the gain resetting circuit 16 resets the gain set to the sensor amplifier 15 according to the difference between the mask irradiated light quantity observed by the irradiated light quantity sensor 30 when the calibration mask 1b stored at the first setting is loaded and the mask irradiated light quantity sensed by the irradiated light quantity sensor 30 at the second setting.

The gain resetting circuit 16 is provided so as to prevent a case where the appropriate normalization operation is not made and the gray scale value of the sensor image is different from the specified value because the apparatus state, such as the light quantity of the light source, is changed at the time of actually inspecting the inspection target mask 1a in the calibration using the calibration mask 1b. Details of the gain resetting circuit 16 will be described below.

Also, the mask inspection apparatus 100 includes a pattern generation circuit 17 and a reference image generation circuit 18 for generating a reference image with which the optical image is compared.

The pattern generation circuit 17 generates a pattern of CAD data (drawing data) or the like stored in the storage device 21 and outputs the generated pattern to the reference image generation circuit 18.

The reference image generation circuit 18 as a reference image generation unit generates the reference image by performing a process of resizing the pattern data input from the pattern generation circuit 17, a corner rounding process, and a point spread functions (PSF) filter process in a batch, and outputs the reference image to the comparison circuit 19. The storage device 21 is, for example, a magnetic disk unit, a magnetic tape unit, a floppy disk (FD), or a semiconductor memory.

The comparison circuit 19 as a comparison unit compares the optical image input from the sensor amplifier 15 with the reference image input from the reference circuit 18, and detects a difference between both pattern shapes as a defect. The inspection result of the comparison circuit 19 is stored in the storage device 21. After that, an operator reads out the stored inspection result from the storage device 21 and display the read inspection result on a display device 22 such as a display, thereby confirming the inspection result.

In the comparison circuit 19, a comparison determination algorithm in which transmission and reflection are combined is used. As a result of the comparison, in the case that a difference between the two exceeds a predetermined threshold, the position is determined to be the defect. Further transmission images can be compared to each other, or reflection images can be compared to each other.

The mask inspection apparatus 100 includes a control computer 20 that performs an overall control, such as offset and gain adjustment of the sensor amplifier 15, alignment of the stage 2, and the like, as well as the general pattern defect inspection. The control computer 20 is connected to the position circuit 12, the auto-loader control circuit 13, the stage control circuit 14, the sensor amplifier 15, the gain resetting circuit 16, the pattern generation circuit 17, the reference image generation circuit 18, the comparison circuit 19, the storage device 21, the display device 22, and the like.

As described above, the output of each pixel of the TDI sensor 11 is amplified with respect to each pixel by the sensor amplifier 15 to generate the optical image. In order to accurately perform the defect inspection by the comparison circuit 19, it is necessary to accurately generate the optical image and efficiently use a dynamic range of the sensor amplifier 15.

Figure 3A:
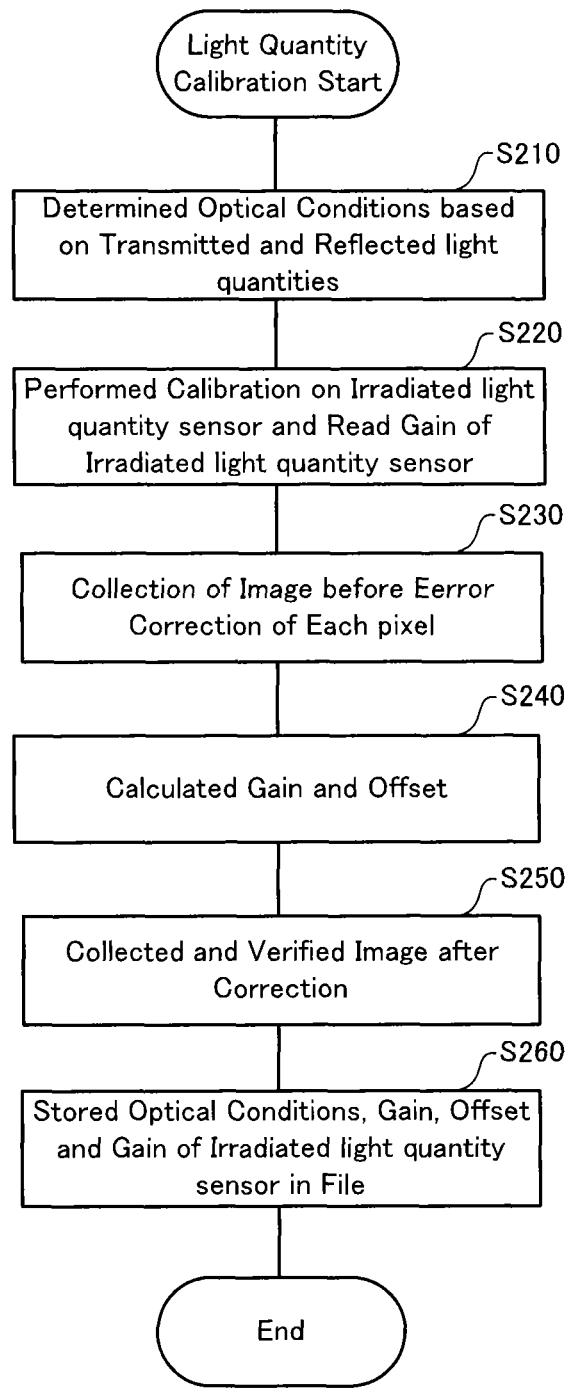
FIG. 3A and FIG. 3B are flowcharts describing the light quantity calibration of the embodiment.
Figure 3B:
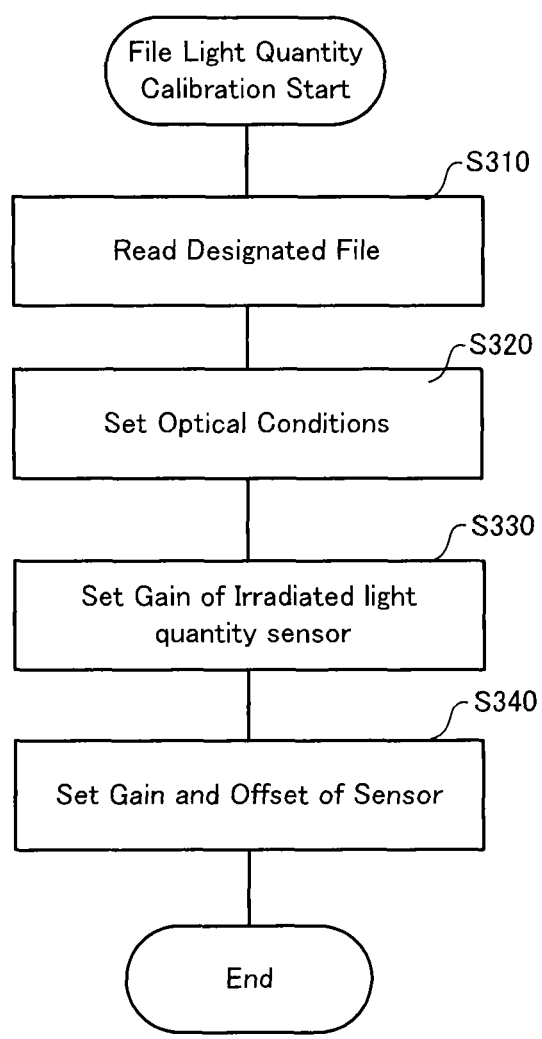

Next, an embodiment of the light quantity calibration used in the mask inspection apparatus 100 will be described with reference to FIG. 3A, FIG. 3B, FIG. 4A and FIG. 4B. FIG. 3A and FIG. 3B are flowcharts describing the light quantity calibration of the embodiment, and FIG. 4A and FIG. 4B are flowcharts describing the general light quantity calibration.

Figure 4A:
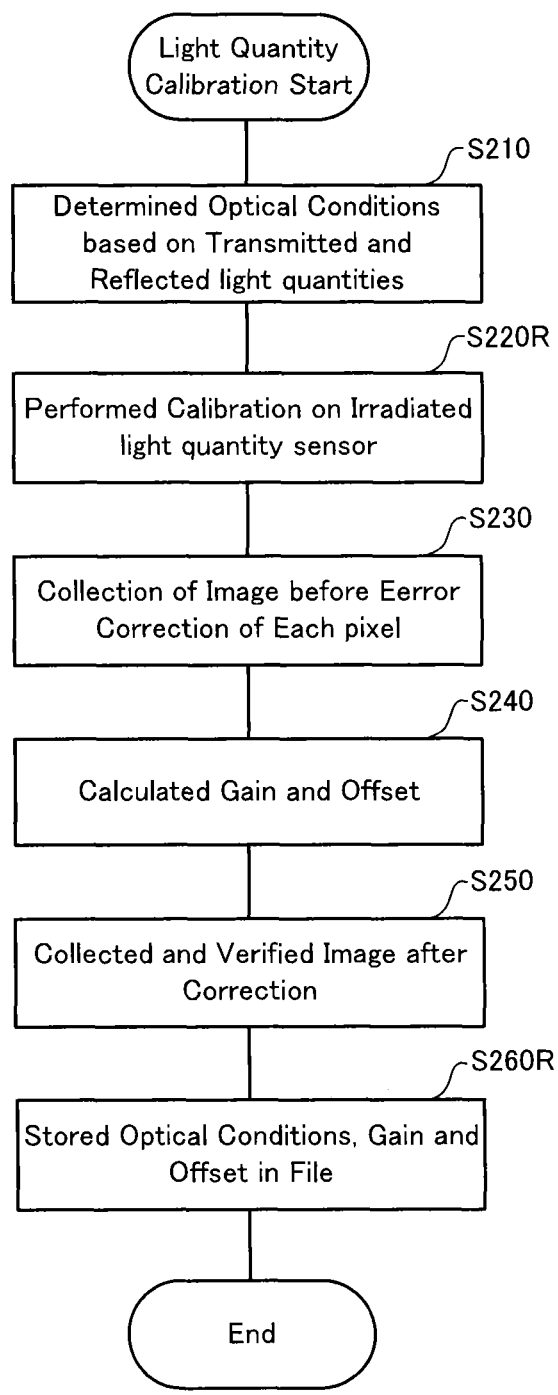
FIG. 4A and FIG. 4B are flowcharts describing the general light quantity calibration.
Figure 4B:
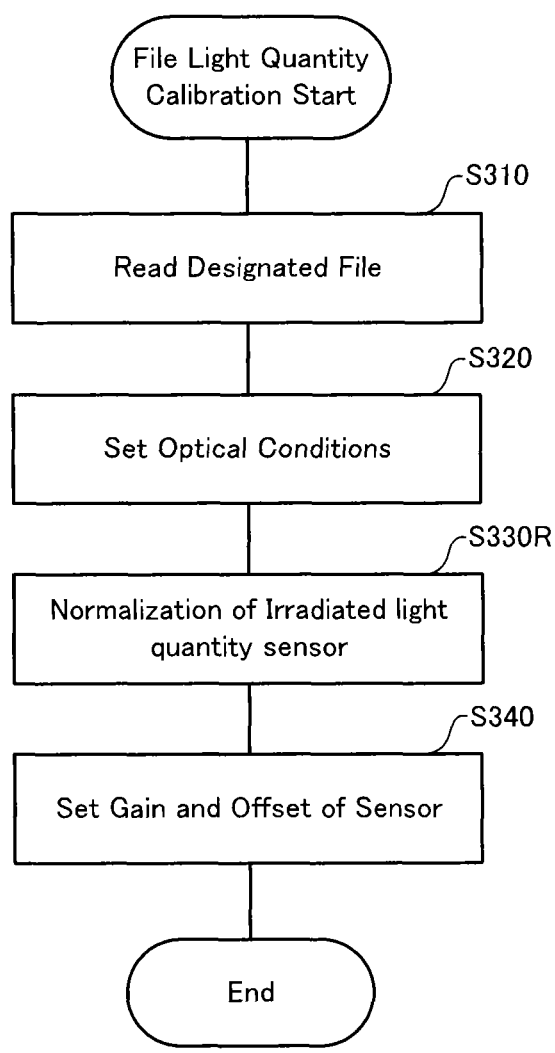

Also, FIGS. 3A and 4A are flowcharts at the first setting at which the light quantity calibration is performed using the calibration mask 1b before the pattern defect inspection is performed on the inspection target mask 1a. FIGS. 3B and 4B are flowcharts at the second setting at which the light quantity calibration is performed using the file stored at the first setting when the defect inspection of the inspection target mask 1a is performed after the first setting.

The light quantity calibration at the first setting will be described using FIG. 3A.

When the calibration mask 1b is mounted on the mask inspection apparatus 100 and the light quantity calibration is started, the optical conditions are determined based on the transmitted and reflected light quantities (step S210). The optical conditions of, for example, a light quantity at which the output of the TDI sensor 11 is not saturated and a filter transmittance at which each of the transmitted and reflected light quantities becomes uniform are determined.

The calibration of the irradiated light quantity sensor 30 is performed based on the light quantity irradiated on the irradiated light quantity sensor 30, and the gain common to pixels of the sensor amplifier 15 is read into the control computer 20 (step S220). The calibration by the irradiated light quantity sensor at this time, for example, determines the gain for keeping a relationship between the light quantity of the light source 6 and the output of the TDI sensor 11 constant.

After that, the collection of the image before the error correction of each pixel of the sensor amplifier 15 is performed (step S230). That is, by the transmitted light or the reflected light irradiated on the calibration mask 1b, the image generated by the sensor amplifier 15 is collected at each pixel of the TDI sensor 11 in a state in which variation among pixels is not corrected.

After that, the gain and the offset for homogenizing the black level of each pixel and the black and white amplitude in the TDI sensor 11 are calculated (step S240). That is, in step S230, the image signal of each pixel collected by the TDI sensor 11 is output to the sensor amplifier 15, and the gain and the offset are calculated in the sensor amplifier 15 that the black level and the amplitude of each pixel become homogeneous.

After that, the image after the correction is collected and verified (step S250). That is, in the sensor amplifier 15, the data output from the sensor amplifier 15 that is corrected, that is, normalized based on the gain and the offset of each pixel calculated in step S240 is collected and verified.

After that, the optical conditions, the gain and the offset, and the gain of the irradiated light quantity sensor are stored in a file (step S260). That is, the optical conditions determined in step S210 are stored in the file, the gain and the offset of each pixel of TDI sensor which are normalized in step S250 is stored in the file, the gain of the irradiated light quantity sensor 30 read in step S220 is stored in the file, and the light quantity calibration at the first setting is ended. The file is stored in, for example, the storage device 21.

Next, the light quantity calibration at the second setting will be described using FIG. 3B.

When the inspection target mask 1a is mounted on the mask inspection apparatus 100 and the file light quantity calibration is started, the designated file is read (step S310). That is, the gain and the offset of the sensor amplifier 15 stored at the first setting in step S260 are read into the sensor amplifier 15.

After that, the optical conditions are set (step S320). That is, the optical conditions determined at the first setting in step S210 and stored in step S260, for example, the transmittance, are determined.

After that, the gain of the irradiated light quantity sensor is set (step S330). That is, the gain determined as the optimal amplitude by the irradiated light quantity sensor 30 at the first setting and the irradiated light quantity of the inspection target mask sensed by the irradiated light quantity sensor 30 at the second setting are read into the gain resetting circuit 16.

After that, the gain and the offset of the sensor amplifier 15 are reset (step S340). That is, the gain of the sensor amplifier 15 is reset based on a difference between the gain observed at the first setting by the irradiated light quantity sensor 30 using the calibration mask in step S330 and the gain observed using the inspection target mask at the second setting.

The gain of the sensor amplifier 15 is reset by the function of the gain resetting circuit 16 in response to a change in the output of the TDI sensor 11, which is caused by a change in the light quantity of the light source 6. Since the sensor amplifier of which the gain has been calibrated is used in the defect inspection on the inspection target mask 1a, the false defect induction can be reduced.

Next, the light quantity calibration at the first setting and the second setting will be described using FIG. 4A and FIG. 4B.

As illustrated in FIG. 4A, steps S210, S230, S240, and S250 are substantially identical to the steps illustrated in FIG. 3A, and a description thereof will not be repeated. In step S220R, the normalization of the irradiated light quantity sensor is performed, and the reading of the gain of the irradiated light quantity sensor illustrated in FIG. 3A is not performed. In step S260R, the optical conditions, the gain, and the offset are stored in the file, but the gain of the irradiated light quantity sensor is not stored in the file because the gain of the irradiated light quantity sensor is not read.

As illustrated in FIG. 4B, steps S310, S320, and S340 are substantially identical to steps illustrated in FIG. 3B, and a description thereof will not be repeated. In step S330R, the normalization of the irradiated light quantity sensor is performed, but the setting of the gain of the irradiated light quantity sensor illustrated in FIG. 3B is not performed.

The processing illustrated in FIGS. 4A and 4B differs from the processing illustrated in FIGS. 3A and 3B in that the light quantity normalized at the first setting is set as the gain of the sensor amplifier 15 at the second setting. In the setting at the second setting, for example, in a case where the first setting is early morning and the second setting is evening, the power of the light source 6 may be changed and the change in the light quantity may occur. The output of the TDI sensor 11 is also changed in response to the change. Even though the output of the TDI sensor 11 is changed, the gain set to the sensor amplifier 15 is the gain set at the first setting. Since the gain is different from the actual gain, the false defect may occur in the defect inspection of the inspection target mask 1a.

FIG. 5 is a table showing the evaluation result of the light quantity calibration of the embodiment and the general light quantity calibration.

The evaluation result of a laser output P1 illustrated in FIG. 5 has been obtained by performing the general light quantity calibration at the laser output P1, storing the result of the light quantity calibration in the file, and capturing the image. According to the evaluation result, the gray scale value is 241.2 when the gray scale reference value of the transmission is 240, and the gray scale value is 199.8 when the gray scale reference value of the reflection is 200. In a case where there is no change in the laser output, it can be seen from the evaluation result that the gray scale value collected with respect to the gray scale reference value shows substantially the same value. (An output of 256 gray scale values (8 bits)/pixel can be obtained from the sensor amplifier. In the case of the transmission (passing the mask), the gray scale value of the glass part (white) is the largest, but the gray scale reference value is set to 240 so as to give a margin to the sensor maximum value. In the case of the reflection (reflection from the mask), the gray scale value of the film part (white) is the largest. However, since dusts with a higher reflectance than the film may be attached, the gray scale reference value is set to 200.)

Also, the evaluation result of the laser output P2 and a laser output P3 illustrated in FIG. 5 has been obtained by performing the file reading light quantity calibration and collecting the image when the laser output P2 and the laser output P3 are changed to the output of 98% and the output of 90%, respectively, with respect to the laser output P1. Each of the light quantity calibration of the embodiment (hereinafter, referred to as after improvement) and the general light quantity calibration (hereinafter, referred to as before improvement) has been evaluated. The timing of the laser output P1 corresponds to the first setting, and the timing of the laser output P2 and the laser output P3 corresponds to the second setting.

According to the evaluation result of the laser output P3 illustrated in FIG. 5, when the gray scale reference value of the transmission is 240, the gray scale value before the improvement is 216.3 and the gray scale value after the improvement is 235.4. Also, when the gray scale reference value of the reflection is 200, the gray the gray scale value before the improvement is 180.8 and the gray scale value after the improvement is 197.2.

From the evaluation result, when changing from the laser output P1 to the laser output P3, that is, when the laser output is changed to 90%, there occurred a great change in the gray scale value before the improvement: −24 (gray scale value) with respect to the gray scale reference value of the transmission and −20 (gray scale value) with respect to the gray scale reference value of the reflection. On the other hand, when the laser output is changed to 90%, it can be seen that, after the improvement, the change in the gray scale value is suppressed, for example, −5 (gray scale value) with respect to the gray scale reference value of the transmission and −3 (gray scale value) with respect to the gray scale reference value of the reflection.

In the evaluation of the laser output P2 illustrated in FIG. 5, the evaluation before the improvement has not been performed. However, in the evaluation after the improvement, the gray scale value is 240.4 when the gray scale reference value of the transmission is 240, and the gray scale value is 199.1 when the gray scale reference value of the reflection is 200. It can be seen from the evaluation result that, after the improvement, the gray scale value collected with respect to the gray scale reference value shows substantially the same value even in a case where the laser output is changed to 98%.

Figure 6:
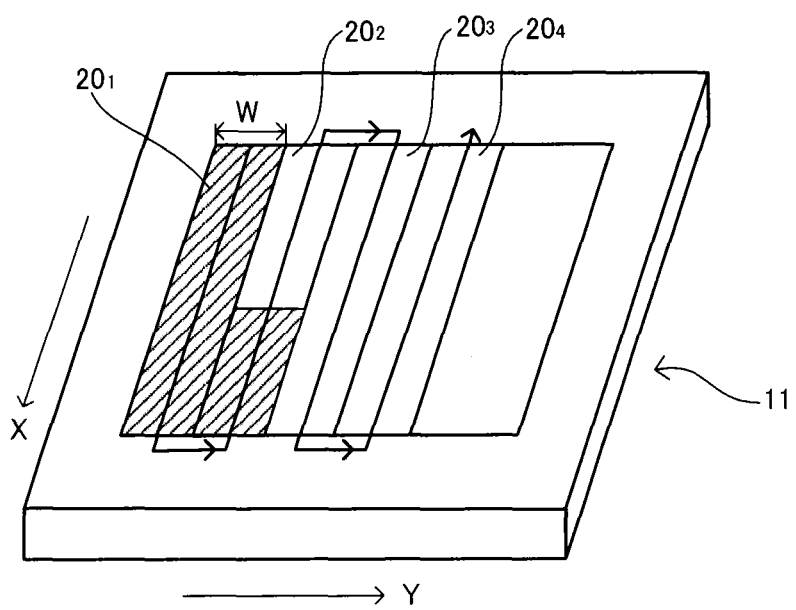
FIG. 6 is a view illustrating an optical image acquisition procedure for the pattern formed in the inspection target mask.

Next, an inspection method for the mask 1a to be inspected, using the mask inspection apparatus 100 will be described. FIG. 6 is a view illustrating an optical image acquisition procedure for the pattern formed in the inspection target mask 1a.

It is assumed that the inspection target mask 1a as shown in FIG. 6 is positioned on the stage 2 in FIG. 1. The inspection region in the inspection target mask 1a is virtually divided into the strip-shaped multiple inspection regions, namely, stripes $20_1$, $20_2$, $20_3$, $20_4$, . . . as illustrated in FIG. 6. For example, each stripe is a region having the width of several hundred micrometers and the length of about 100 mm corresponding to the total length in the X-direction or Y-direction of the inspection target mask 1a.

The optical image is acquired in each stripe. That is, in acquiring the optical image in FIG. 6, the operation of the stage 2 is controlled such that the each stripe $20_1$, $20_2$, $20_3$, $20_4$, . . . is continuously scanned. Specifically, the optical image of the inspection target mask 1a is acquired while the stage 2 moved in the −X-direction of FIG. 6. The image having a scan width W as shown in FIG. 6 is continuously input to the TDI sensor 11 as shown in FIG. 1.

That is, the image of the second stripe $20_2$ is acquired after the image of the first stripe $20_1$ is acquired. In this case, after the stage 2 moves in the −Y-direction in a stepwise manner, the optical image is acquired while the stage 2 moves in the direction (X-direction) opposite to the direction (−X-direction) in which the image of the first stripe $20_1$ is acquired, and the image having the scan width W is continuously input to the TDI sensor 11.

In the case that the image of the third stripe $20_3$ is acquired, after moving in the −Y-direction in the stepwise manner, the stage 2 moves in the direction opposite to the direction (X-direction) in which the image of the second stripe $20_2$ is acquired, namely, the direction (−X-direction) in which the image of the first stripe $20_1$ is acquired. An arrow in FIG. 6 indicates the optical image acquiring direction and sequence, and a hatched portion indicates the region where the optical image is already acquired.

The TDI sensor 11 performs the photoelectric conversion to the pattern image formed on the TDI sensor 11 as shown in FIG. 1, and the sensor amplifier 15 performs the A/D (analog-digital) conversion to the pattern image. Then the optical image is transmitted from the sensor amplifier 15 to the comparison circuit 19 as shown in FIG. 1.

The A/D-converted sensor data is input to a digital amplifier 152 that can adjust an offset and a gain in each pixel. The gain for each pixel of the digital amplifier 152 is determined by the light quantity calibration as explained above.

The generation of the reference image will be described as follows. In the case of inspection by the die-to-database comparison method, the reference image generated from the design pattern data becomes a reference of the defect determination. In the inspection apparatus 100, the design pattern data used to form the pattern in the inspection target mask 1a is stored in the storage device 21.

Next, in the pattern generating process, the pattern generating circuit 17 as shown in FIG. 1 reads the design pattern data from the storage device 21 through the control computer 20, and converts the read design pattern data of the inspection target mask 1a into the binary or multi-value image data (design image data). The image data is transmitted to the reference image generating circuit 18.

Next, in the filtering process, the reference image generating circuit 18 as shown in FIG. 1 performs the proper filtering to the design pattern data, that is, the graphic image data. The reason is as follows.

In the production process because roundness of the corner and a finished dimension of the line width is adjusted, the pattern in the inspection target mask 1a is not strictly matched with the design pattern. The optical image data, that is, the optical image obtained from the sensor amplifier 15 in FIG. 1 is faint due to a resolution characteristic of the optical system or an aperture effect of the TDI sensor 11, in other words, the state in which a spatial lowpass filter functions.

Therefore, the mask that becomes the inspection target is observed in advance of the inspection, a filter coefficient imitating the production process or a change of an optical system of the inspection apparatus is determined to subject the design pattern data to a two-dimensional digital filter. Thus, the processing of imitating the optical image is performed to the reference image.

The learning process of the filter coefficient may be performed using the pattern of the mask that becomes the reference fixed in the production process or a part of the pattern of the mask (in the first embodiment, the inspection target mask 1a) that becomes the inspection target. In the present embodiment, the filter condition is determined using the above-described calibration mask, and the determined condition is set to the inspection target mask.

In the case that the mask that becomes the inspection target is used in a learning process of the filter coefficient, advantageously the learning process of the filter coefficient can be performed without removing influences such as a variation of production lot and a fluctuation in condition of the inspection apparatus. However, when the dimension fluctuates in the surface of the mask, the filter coefficient becomes optimum with respect to the position used in the learning process, but the filter coefficient does not necessarily become optimum with respect to other positions, which results in a pseudo defect. Therefore, preferably the learning process is performed around the center of surface of the mask that is hardly influenced by the fluctuation in dimension. Alternatively, the learning process is performed at multiple positions in the surface of the mask, and the average value of the obtained multiple filter coefficients may be used.

Next, the optical image data acquired in the optical image acquisition process is transmitted from the sensor amplifier 15 to the comparison circuit 19. The reference image generating circuit 18 transmits the reference data to the comparison circuit 19. The comparison circuit 19 compares the optical image data to the reference data by the die-to-database method.

Specifically, the captured image of the stripe data is extracted in units of inspection frames. Each of the inspection frames is compared to the data that becomes the reference of the defect determination using a proper comparison determination algorithm. The data that becomes the inspection target is determined to be the defect when the difference between the two exceeds the predetermined threshold. The information on the defect is stored as a mask inspection result. For example, the defect coordinate and the optical image which are the basis of the defect determination are stored in the storage device 21.

For example, it is assumed that chip patterns are matrix in the inspection target mask 1a. In the die-to-database comparison method, when the chip is considered as the inspection target, the chip is determined to be the defect in the case that the pattern difference between the optical image and reference image of the chip exceeds the predetermined threshold.

More specifically the defect determination can be made by the following two methods. One of the methods is the method for determining that the inspection target is the defect in the case that the difference exceeding a predetermined threshold is recognized between the position of a contour in the reference image and the position of a contour in the optical image. The other method is the method for determining that the inspection target is the defect in the case that the ratio of the pattern line width in the reference image and the pattern line width in the optical image exceeds a predetermined threshold. In this method, the ratio of the inter-pattern distance in the reference image and the inter-pattern distance in the optical image may be used.

Next, the mask inspection result which is stored, is transmitted to a review tool. The review tool may be one of the components included in the inspection apparatus. Alternatively, the tool may be an external device of the inspection apparatus. A review process is an operation in which the operator determines whether the detected defect will become a practical problem. For example, the operator visually determines whether the defect needs to be corrected by comparing the reference image that is the basis of the defect determination to the optical image including the defect.

The defect information determined through the review tool is also stored in the storage device 21 as shown in FIG. 1. When the defect to be corrected is confirmed by the review tool, the inspection target mask 1a is transmitted to a repair apparatus, that is, the external device of the inspection apparatus 100 together with a defect information list. Because a correction method depends on whether the defect is projected or recessed, a defect type including the distinction between the projection and the recess and the defect coordinate are added to the defect information list.

According to the mask inspection apparatus and the mask inspection method of the present embodiment as described above, in a case where the light quantity at the time when the light quantity calibration is performed using the calibration mask is different from the light quantity at the time when the inspection target mask is inspected, the gain resetting circuit 16 is provided to store the gain corresponding to the normalization of the irradiated light quantity sensor 30. By adding the difference between the gain of the irradiated light quantity sensor 30 at this time and the stored gain of the irradiated light quantity sensor 30 to the sensor amplifier 15 as a parameter, the gain set to the sensor amplifier 15 can be reset.

As described above, the gain of the sensor amplifier 15 is reset in response to the change in the light quantity of the light source 6. It is therefore possible to prevent the gray scale value of the image of the TDI sensor 11 from being different from the specified value. It is also possible to reduce the false defect induction in the defect inspection on the inspection target mask 1a. The remarkable operational effects of the present embodiment have been demonstrated in the above evaluation results.

The present invention is not limited to the embodiments described and can be implemented in various ways without departing from the spirit of the invention.

The above description of the present embodiment has not specified apparatus constructions, control methods, etc., which are not essential to the description of the invention, since any suitable apparatus construction, control methods, etc. can be employed to implement the invention. Further, the scope of this invention encompasses all inspection methods and inspection apparatuses employing the elements of the invention and variations thereof, which can be designed by those skilled in the art.

What is claimed is:

1. A mask inspection apparatus comprising:
a stage control circuit configured to drive a stage holding an inspection target mask, in which a pattern is formed, or a calibration mask different from the inspection target mask;
a light irradiation device configured to irradiate light on the inspection target mask or the calibration mask;
an image sensor configured to detect a light quantity signal of transmitted light or reflected light of the inspection target mask or the calibration mask at a plurality of pixels;
a sensor amplifier configured to amplify an output of each of the pixels of the image sensor according to a gain and an offset for each pixel of the image sensor, wherein the sensor amplifier sets the gain and the offset based on the light quantity signal of transmitted light or reflected light of the calibration mask;
a gain resetting circuit configured to reset the gain according to a difference between a first apparatus state when the image sensor detects the light quantity signal of transmitted light or reflected light of the calibration mask, and a second apparatus state when the image sensor detects the light quantity signal of transmitted light or reflected light of the inspection target mask;
the sensor amplifier is further configured to generate an optical image of the inspection target mask based on the reset gain and the offset;
a reference image generation circuit configured to generate a reference image serving as a standard image for the optical image; and
a comparison circuit configured to inspect a defect of the pattern of the inspection target mask by comparing the optical image with the reference image.

2. The mask inspection apparatus according to claim 1, further comprising:
an irradiated light quantity sensor configured to be installed in the light irradiation device and sense a light quantity irradiated from the light irradiation device; wherein
the difference between the apparatus states is a difference between light quantities sensed by the irradiated light quantity sensor when illuminating the calibration mask and when illuminating the inspection target mask.

3. The mask inspection apparatus according to claim 1, wherein the inspection target mask or the calibration mask is a mask with a pellicle.

4. The mask inspection apparatus according to claim 2, wherein the inspection target mask or the calibration mask is a mask with a pellicle.

5. The mask inspection apparatus according to claim 1, wherein the image sensor is a TDI sensor.

6. The mask inspection apparatus according to claim 2, wherein the image sensor is a TDI sensor.

7. A mask inspection method for inspecting a defect of a pattern formed in an inspection target mask by using a mask inspection apparatus, comprising the steps of:
illuminating a calibration mask different from the inspection target mask with light from a light source through an objective lens while sensing a first apparatus state of the mask inspection apparatus, and detecting a light quantity signal of transmitted light or reflected light of the calibration mask at a plurality of pixels of an image sensor while relatively moving the image sensor with respect to the calibration mask;

amplifying an output of each of the pixels of the image sensor according to a normalized gain and offset for each pixel of the image sensor;

illuminating the inspection target mask with light from the light source through the objective lens while sensing a second apparatus state of the mask inspection apparatus, and detecting a light quantity signal of transmitted light or reflected light of the inspection target mask at a plurality of pixels of the image sensor while relatively moving the image sensor with respect to the inspection target mask;

resetting the gain according to a difference between the first apparatus state sensed when illuminating the calibration mask and the second apparatus state sensed when illuminating the inspection target mask, normalizing the reset gain and the offset of a signal amplitude of an output of each pixel of the image sensor, amplifying the output of each of the pixels of the image sensor based on the normalized and reset gain and offset, and generating an optical image of the inspection target mask based on the amplified output of each of the pixels of the image sensor; and comparing the optical image of the inspection target mask with a reference image serving as a standard image for the optical image of the inspection target mask.

8. The mask inspection method according to claim 7, wherein the difference between the apparatus states is a difference between a light quantity when illuminating the calibration mask with light from a light source and a light quantity when illuminating the inspection target mask with light from the light source.

9. The mask inspection method according to claim 7, wherein the inspection target mask or the calibration mask is a mask with a pellicle.

10. The mask inspection method according to claim 8, wherein the inspection target mask or the calibration mask is a mask with a pellicle.

11. The mask inspection method according to claim 7, wherein the image sensor is a TDI sensor.

12. The mask inspection method according to claim 7, further comprising:

determining the pattern as a defect when a comparison result of the comparing exceeds a preset threshold value.

\* \* \* \* \*